United States Patent
Gresset et al.

(10) Patent No.: US 9,420,746 B2
(45) Date of Patent: *Aug. 23, 2016

(54) ROUND BALER DISCHARGE APPARATUS

(75) Inventors: Pascal Gresset, Auxon Dessous (FR);
Emmanuel Chapon, Velet (FR);
Mickael Zabe, Roche et Raucourt (FR)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,712

(22) Filed: Jul. 25, 2012

(65) Prior Publication Data

US 2014/0026768 A1    Jan. 30, 2014
US 2016/0150735 A9    Jun. 2, 2016

(30) Foreign Application Priority Data

Jul. 27, 2011   (DE) .................. 10 2011 079 937

(51) Int. Cl.
*A01F 15/08* (2006.01)
*A01F 15/07* (2006.01)
*A01F 15/06* (2006.01)

(52) U.S. Cl.
CPC ............ *A01F 15/0883* (2013.01); *A01F 15/06* (2013.01); *A01F 15/07* (2013.01)

(58) Field of Classification Search
CPC .......... A01F 2015/0795; A01F 15/07; A01F 15/0833; A01F 2015/078; A01F 2015/0775; A01F 15/106; A01F 15/0883; B30B 17/10853; B30B 11/222
USPC .................. 100/87, 88, 89; 56/341

See application file for complete search history.

(56) References Cited

U.S. PATENT DOCUMENTS

| | | | |
|---|---|---|---|
| 3,451,112 A * | 6/1969 | Geiger et al. .................. 492/52 |
| 4,683,815 A * | 8/1987 | Van Ryswyk .................. 100/88 |
| 5,381,887 A * | 1/1995 | Emmons ...................... 198/830 |
| 5,873,291 A * | 2/1999 | Sand ............................... 83/260 |
| 6,240,712 B1 * | 6/2001 | Meijer ...................... 56/16.4 R |
| 2005/0188862 A1 * | 9/2005 | Hoover et al. ................. 100/87 |
| 2005/0257513 A1 * | 11/2005 | Smith et al. .................... 56/341 |
| 2006/0278103 A1 * | 12/2006 | Derscheid ...................... 100/88 |
| 2008/0041028 A1 * | 2/2008 | Viaud ............................. 56/341 |
| 2009/0223783 A1 * | 9/2009 | Herold ...................... 198/844.2 |

FOREIGN PATENT DOCUMENTS

DE    10338349 A1    8/2004
DE    102005036181    2/2007
(Continued)

OTHER PUBLICATIONS

European Search Report dated Nov. 13, 2012 (6 pages).
(Continued)

*Primary Examiner* — Alexander P Taousakis
*Assistant Examiner* — Onekki Jolly

(57) ABSTRACT

A round baler is provided having a frame, a baling chamber formed on the frame to form a round bale, a discharge region formed between the baling chamber and a base surface, and at least one handling element which is arranged in the discharge region and which extends parallel to the rotation axis of the round bale and serves to support the round bale during the discharge process. To reduce the mechanical load of the round bale, the handling element has an elastic layer which is elastically deformable under the effect of the round bale during the discharge process.

13 Claims, 4 Drawing Sheets

(56) References Cited

FOREIGN PATENT DOCUMENTS

| | | |
|---|---|---|
| DE | 102006038299 A1 | 2/2008 |
| DE | 102011079940 A1 | 1/2013 |
| EP | 1264531 A1 | 12/2002 |
| EP | 1731023 A1 | 12/2006 |
| EP | 1889534 A1 | 2/2008 |
| SU | 1759307 A1 | 9/1992 |

OTHER PUBLICATIONS

Eurasian Search Report dated Jan. 30, 2013 (2 pages).
German Search Report issued in counterpart application No. 102011079937.0, dated Sep. 4, 2014 (7 pages).

* cited by examiner

ROUND BALER DISCHARGE APPARATUS

FIELD OF THE DISCLOSURE

The disclosure concerns a round baler with a frame, a baling chamber formed on the frame to form a round bale, a discharge region formed between the baling chamber and a base surface, and at least one handling element which is arranged in the discharge region and which extends parallel to the rotation axis of the round bale and serves to support the round bale during a discharge process.

BACKGROUND OF THE DISCLOSURE

When discharging a round bale from the baling chamber of a round baler, it is desirable to control the movement of the bale. In particular, a problem arises with round bales which are wrapped with a net or yarn and are subject to a highly dynamic discharge process. In the discharge process, the round bale is typically released from the baling chamber and for example falls onto a discharge ramp fitted with handling elements which transfer the round bale into a controlled rolling movement. Depending on the design and arrangement of the discharge region, the round bale often undergoes an extreme direction change in its movement, in particular in highly dynamic, rapid discharge processes as occur in high performance modern round balers. Such a round baler is disclosed for example in German Patent Document DE 10 2005 036 181 A1. The discharge processes entailing such extreme direction changes for the round bale lead to extreme loads on the round bale, which often lead to damage to the round bale, in particular to tears in the net or twine when the round bale falls onto the handling elements and is to be transferred from a virtually vertical discharge movement into a horizontal discharge movement or rolling movement.

To counter such damaging incidents, it is known for example from round balers by WELGER to structure a support element formed on a discharge ramp as a roller mounted by way of springs on the frame or on a discharge ramp in order to absorb some of the kinetic energy of the round bale. Such a design of a spring-mounted roller is however, structurally complex, maintenance-intensive and susceptible to faults.

SUMMARY OF THE DISCLOSURE

The object of the disclosure is to specify a round baler of the type cited initially which overcomes the aforementioned problems.

According to the disclosure, a round baler of the type cited initially is fitted with a handling element on which is formed an elastic layer which is elastically deformable under the effect of the round bale during the discharge process. Because the round bale in the discharge process acts directly or indirectly on an elastic layer, part of the kinetic energy can be compensated and the load on the round bale substantially reduced so that the damage to the round bale described above is avoided. The round bale is thus dampened in its movement during the discharge process and a mechanical load imposed by the handling element on the outer sleeve or edge layer of the round bale is reduced. The handling element can be formed as part of a discharge ramp hinged to the frame of the round baler or be attached directly to the frame itself. The handling element is arranged below the baling chamber in the discharge region so that the round bale falls onto the handling element upon discharge. The discharge region describes the entire region through which the round bale passes on leaving the baling chamber. This includes in particular a discharge opening which opens the baling chamber and through which the bale is guided, the region in which a discharge ramp is arranged via which the round bale is guided to the ground surface, and a region in-between through which the round bale is either guided or moves under gravity or its inertia. For the round bale to be transferred from an almost vertical movement into a horizontal movement in the discharge process, the handling element can be arranged such that the round bale falling onto the handling element lies with its rotation axis behind the handling element in the forward travel direction so that the handling element generates for the round bale a rotation impulse (movement impulse) directed onto the round bale and acting against the forward travel direction. The handling element can however also be arranged centrally to the rotation axis or such that the round bale lies with its rotation axis in front of the handling element in the forward movement direction. The rotation impulse can then be force-applied, for example by additional means.

The handling element can extend at least over part of the width of the round bale, preferably over the entire width of the round bale, wherein also partial segments can be arranged distributed over the width so that the round bale is supported in segments over its width.

The handling element can comprise a profile carrier on which the elastic layer is formed at least partially. The profile carrier can be formed as a tubular profile or as a solid profile and have different cross-sections. L-shaped, C-shaped, I-shaped, U-shaped or also closed round or rectangular profiles can be used. Non-round, i.e. elliptical or oval or even polygonal cross-sections are also possible.

The handling element can comprise a roller on which the elastic layer is formed at least partially. The handling element can be formed as a round profile, i.e. a solid or hollow roller, and accordingly constitute a rod or tube.

The handling element can furthermore also comprise a flat profile such as a plate or sheet on which the elastic layer is formed at least partially. The flat profile can here be formed as a plate or also as a solid panel.

The elastic layer can also be fitted with a covering at least in part. This can take the form of an envelope, protective sleeve or coating. The covering or envelope or coating serves to protect the elastic layer and can for example be formed as a tube or another hollow body or from a body surrounding the handling element at least in part. A correspondingly resistant or stable film can also be used.

The elastic layer can be formed from a foam, an elastomer or another elastic material. Foam materials or foams or materials containing rubber or synthetic rubber can be used which have a corresponding elasticity under the weight of the round bale and can deform under the influence of the kinetic energy of the round bale. Other materials with the same or similar elastic properties can also be used.

To achieve a greater cushioning effect or to reduce further the mechanical or kinetic load of the round bale, several handling elements can be arranged in parallel and together support or cushion the round bale in the discharge process.

BRIEF DESCRIPTION OF THE DRAWINGS

The embodiments of the present disclosure are described in detail below with reference to the accompanying drawing figures wherein.

DETAILED DESCRIPTION OF THE DRAWINGS

Figure 1:
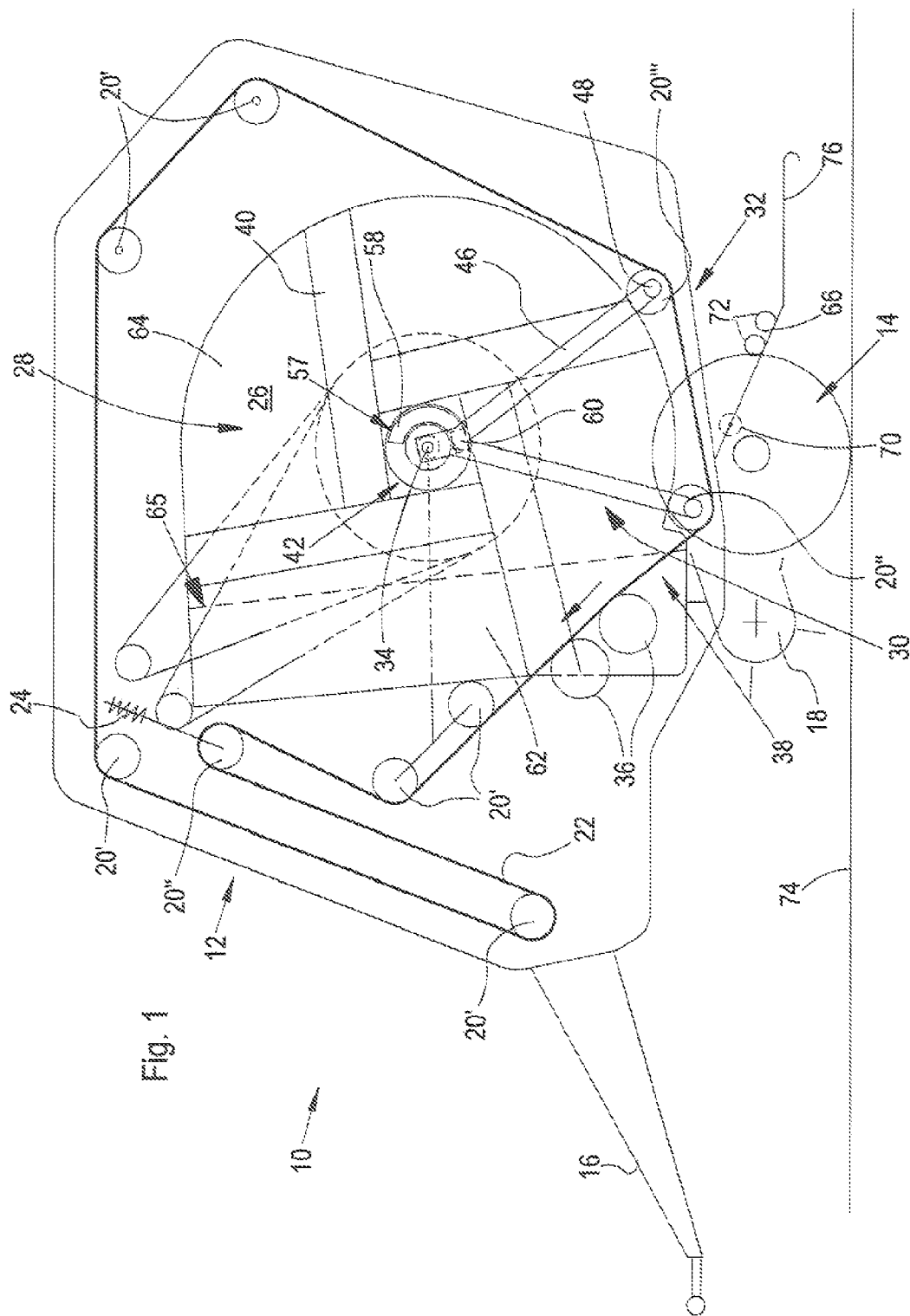
FIG. 1 is a schematic side view of a round baler according to the disclosure in a closed position with a first embodiment of a discharge ramp with a handling element formed in the discharge region.

A round baler 10 shown in FIG. 1 has a frame 12, a chassis 14, a drawbar 16, a receiver device 18, rollers 20 (20', 20", 20'''), baling elements 22, a tensioning device 24, side walls 26, a baling chamber 28 delimited by the side walls 26 and the baling elements 22, swivel elements 30 and a discharge region 32.

In the exemplary embodiment shown, the round baler 10 is fitted with a baling chamber 28, the size of which can be modified by mobile baling elements 22, but can also be fitted with a fixed size baling chamber 28 with stationary baling elements. In the baling chamber 28, crop collected from the ground can be formed into a round bale which with its end faces presses on the side walls 26.

The frame 12 is a welded and/or bolted assembly on which are attached all components of the round baler 10, which rests on the chassis 14 and can be connected via the drawbar 16 to a tractor vehicle (not shown). The frame 12 carries, amongst other things, lining elements (not shown), some of the rollers 20, the side walls 26 and the swivel elements 30. The frame 12 loosely surrounds the region delimited by the side walls 26 and the baling elements 22.

The chassis 14 consists in a manner not described in more detail of an axle and wheels on which rests the frame 12.

The drawbar 16 engages rigidly or height-adjustably on the front of the frame 12.

The pick-up device 18 is formed in the usual manner as a pick-up and is connected height-adjustably to the frame 12. The pick-up 18 can also be fitted after a cutter device known per se. The pick-up 18 collects crop deposited on the ground and passes it—where applicable via a cutting device—to the baling chamber 28 where it is formed into a cylindrical round bale.

Some of the rollers 20 are rotatably mounted in a fixed location in the frame 12 and are designated 20', another of the rollers 20 can be adjusted against the force of a spring (not shown in more detail) so that the baling elements 22 can adapt to the growing bale diameter and is designated 20"; yet further rollers 20 swivel on swivel elements 30 about a swivel axis 34. These rollers 20 are denoted 20''' and are formed wide and running parallel to each other such that the baling elements 22 run over them and can surround the baling chamber 28. As well as the rollers 20, rolls 36 are provided which are located above an input opening 38 in the baling chamber 28. The rolls 36 serve as starter rollers at the start of bale formation and can support part of the weight of the round bale.

The baling elements 22 are formed as belts running parallel to each other which substantially cover the width of the baling chamber 28. Instead of being formed as belts, a rod chain conveyor or a broad belt could be selected, as is also known. In this case only one baling element would be present, which would however also fall within the scope of protection. The baling elements 22 are endless and are set in a circulating motion due to their lying with friction or form connection on at least one drivable roller 20. In the region of the input opening 38, the baling elements 22 form a bridge which, as the amount of crop increases, forms into an inwardly expanding loop and surrounds the round bale. The baling elements 22 are held under tension since they are guided over the roller 20', the position of which can change.

The tensioning device 24 is formed in a known manner in that the roller 20" is guided on an arm, slide or similar (not shown), against the force of a spring, and a loop of the baling elements 22 is always held tensioned.

The side walls 26 are substantially D-shaped in the view of FIG. 1, wherein the rear end region on the right in FIG. 1 forms a curve which substantially follows the contour of the finished round bale, i.e. an arc. The side walls 26 are in principle formed of two parts and contain a front and a rear segment 62 and 64 which are connected swivelably together. Each segment 62, 64 can be composed of several pieces. The side walls 26 assume a distance from the frame 12 and can thus be deflected outwards, as will be described below. The rear segments 64 of the side walls 26 are formed in a deflection-resistant manner by way of reinforcing webs 40, wherein the reinforcing webs 40 can be screwed or welded on. According to the depiction in FIG. 1, the reinforcing webs 40 run virtually star-shaped in relation to the swivel axis 34 and run tangentially past this at a slight distance in order finally to abut each other virtually perpendicularly. Because of this course, in this embodiment they enclose a four-cornered chamber 42.

In a front end region, the rear segments 64 are connected swivelably within limits with the frame 12 via a hinge (not shown) and the front segments 62. The rear segment 64 is connected to the front segment 62 substantially along a virtually vertical line with a pivot axis 65 in the region of the front segment 62, i.e. in the region of the baling chamber 28. In the region of the swivel axis 34, each side wall 26 or its rear segment 64 is guided on an axle which is rigidly attached to the frame 12 and also serves as a swivel axis 34 for the swivel elements 30.

In contrast to the embodiment example shown, the connection of the side wall 26 or side walls 26 can also take place along an upper, virtually horizontal or slightly oblique line, so that a downwardly open divergence of the side walls 26 exists when the round bale is ejected.

The baling chamber 28 can be modified in size and initially, i.e. when the baling chamber 28 is empty, is delimited by an approximately triangular cylindrical cavity between the receiver device 18 and the baling elements 22 and at the side by the side walls 26. As the amount of crop supplied increases, the baling chamber 28 expands and finally assumes a cross section which in the rear region follows the form of the side walls 26.

The swivel elements 30 in this embodiment example have on each side one or more arm(s) 46 running radially to the swivel axis 34 and one or more crosspiece(s) 48 attached on their radially outer ends and running transverse thereto. At the end of each arm 46 is provided a roller 20'''. The swivel elements 30 are arranged pivotably on the axle 34 with the radially inner end of each arm 46. The position of the arms 46 is controlled by way of a drive (not shown) which contains a motor and a swivel drive for each swivel element 30. The motor can be braked in its respective positions and holds the arms 46 correspondingly stationary. The swivel elements 30 are controlled such that the front swivel element 30 is adjusted during the bale formation phase in order to assist in forming a bale core, and that the rear swivel element 30 assumes a lower position while the round bale is formed, and an upper position when it is ejected. The lower end position of the swivel element 30 is shown in FIG. 1, wherein the upper end position is a position corresponding to a rotation of the swivel element counterclockwise by around 90° to 180° such that the discharge region 32 is opened and a compressed bale is ejected by swiveling the swivel element 30.

The round baler described above is substantially described in all details in European patent application no. 01112927.7-2313 of 6 Jun. 2001, the content of which is hereby included in this application. However, the present disclosure can be applied to any common round baler type as it concerns merely part of the side walls 26 pivoting away outwards on ejection of the finished round bale and thus the friction on the round bale can be minimized.

A pusher device 57 contains a rising face 58 and a follower element 60 and on ejection of the round bale serves to reduce the pressure and hence the friction of the side walls 26 on its end faces so that the round bale can be discharged from the baling chamber 28 more easily. The rising face 58 lies on an arc running concentric to the swivel axis 34 and is attached to the outside of both side walls 26, although it would be sufficient to provide just one rising face, i.e. on one side wall 26. In the present embodiment example, the rising face 58 is formed by a curved steel wedge which is bolted to the side walls 26 rising evenly inside the chamber 42.

The follower element 60 is provided on the side of the arm 46 of the rear swivel element 30 facing the longitudinal centre plane of the round baler 10 and is formed as a slide surface. To minimize friction, the friction surfaces are lubricated; alternatively, the follower element 60 can also be formed as a wheel, roller, ball or similar rotating element. The follower element 60 is arranged such that on rotation of the swivel element 30 about the swivel axis 34, it describes a round orbit and moves on the rising face 58. Preferably, the follower element 60 is always in contact with the rising face 58.

The follower element 60 lies on the highest protrusion of the sloping surface 58 when the rear swivel elements 30 are in their lower end position—see FIG. 1—and the round bale can be generated. When the swivel elements 30 are brought to their upper end position in which the round bale can be discharged from the baling chamber 28, the follower element 60 is moved to the lowest position of the rising face 58. The difference between the highest and the lowest position can be e.g. around 20 to 50 mm.

As soon as around bale is formed in the baling chamber 28, the rear swivel element 30 is raised, whereupon because of the pressure prevailing in the pressure chamber 28 from the compressed crop, the rear segments 64 of the side walls 26 move outwards. As a result, the friction between the inside of the side walls 26 and the end faces of the round bale is reduced and the latter falls under gravity out of the baling chamber 28. As soon as the round bale has left the baling chamber 28 and the round baler 10 has moved on so far that the rear swivel element 30 can be lowered again, a swivel movement of the rear swivel element 30 occurs in the opposite direction so that the follower element 60 is moved towards the greatest protrusion of the rising face 58 and presses the rear segments 64 of the side walls 26 inwards.

Figure 2:
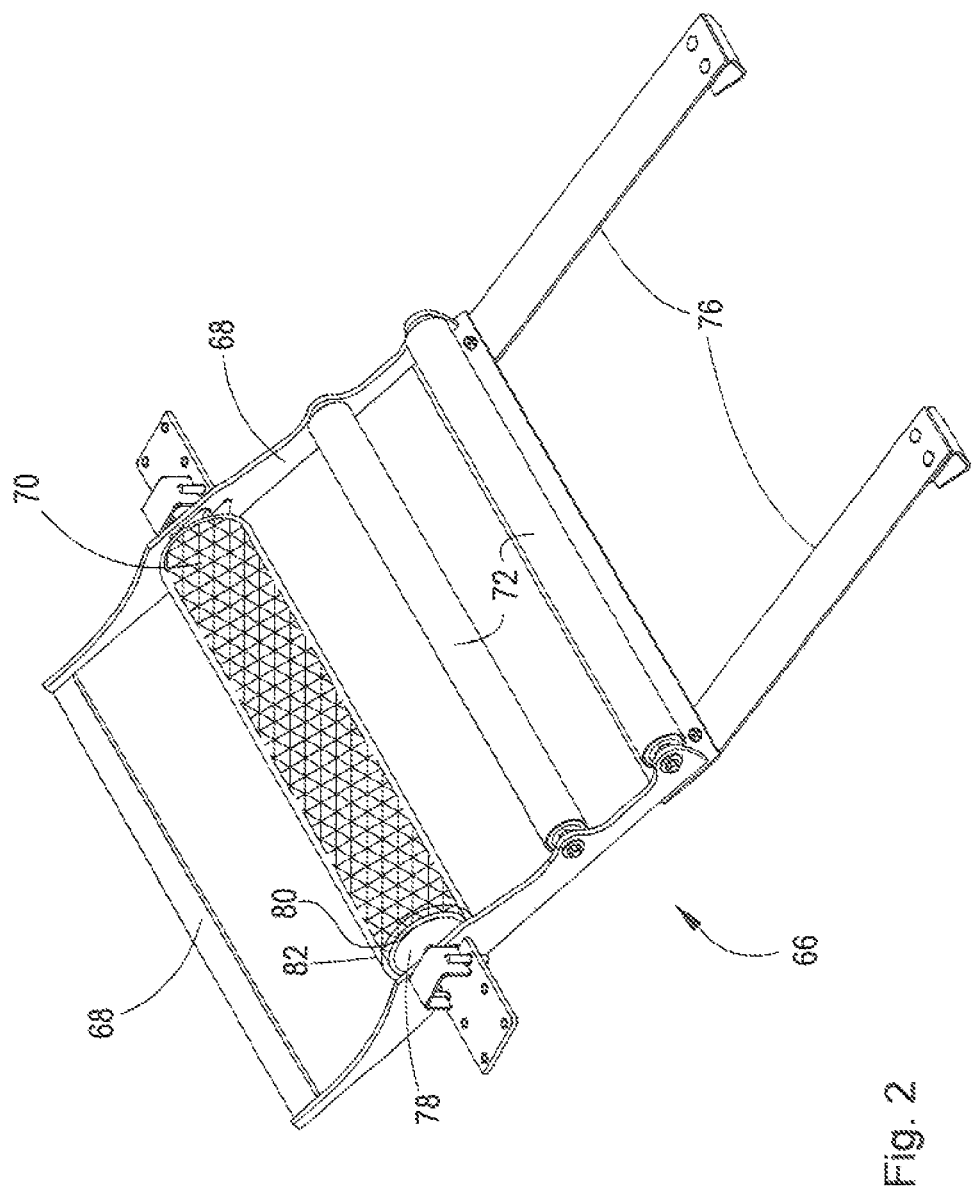
FIG. 2 is a schematic perspective side view of the discharge ramp in FIG. 1 with a first embodiment of the handling element.
Figure 3:
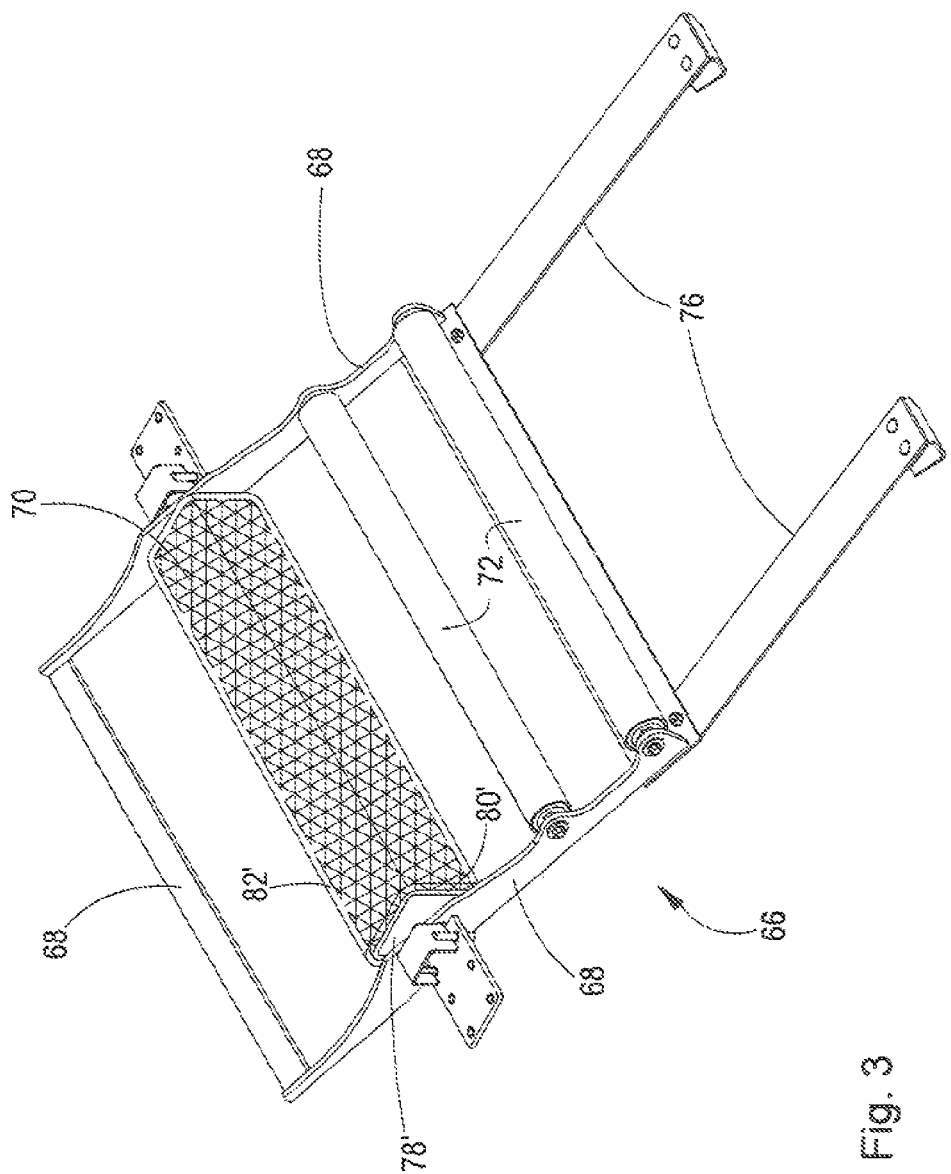
FIG. 3 is a schematic perspective side view of the discharge ramp in FIG. 1 with a second embodiment of the handling element.
Figure 4:
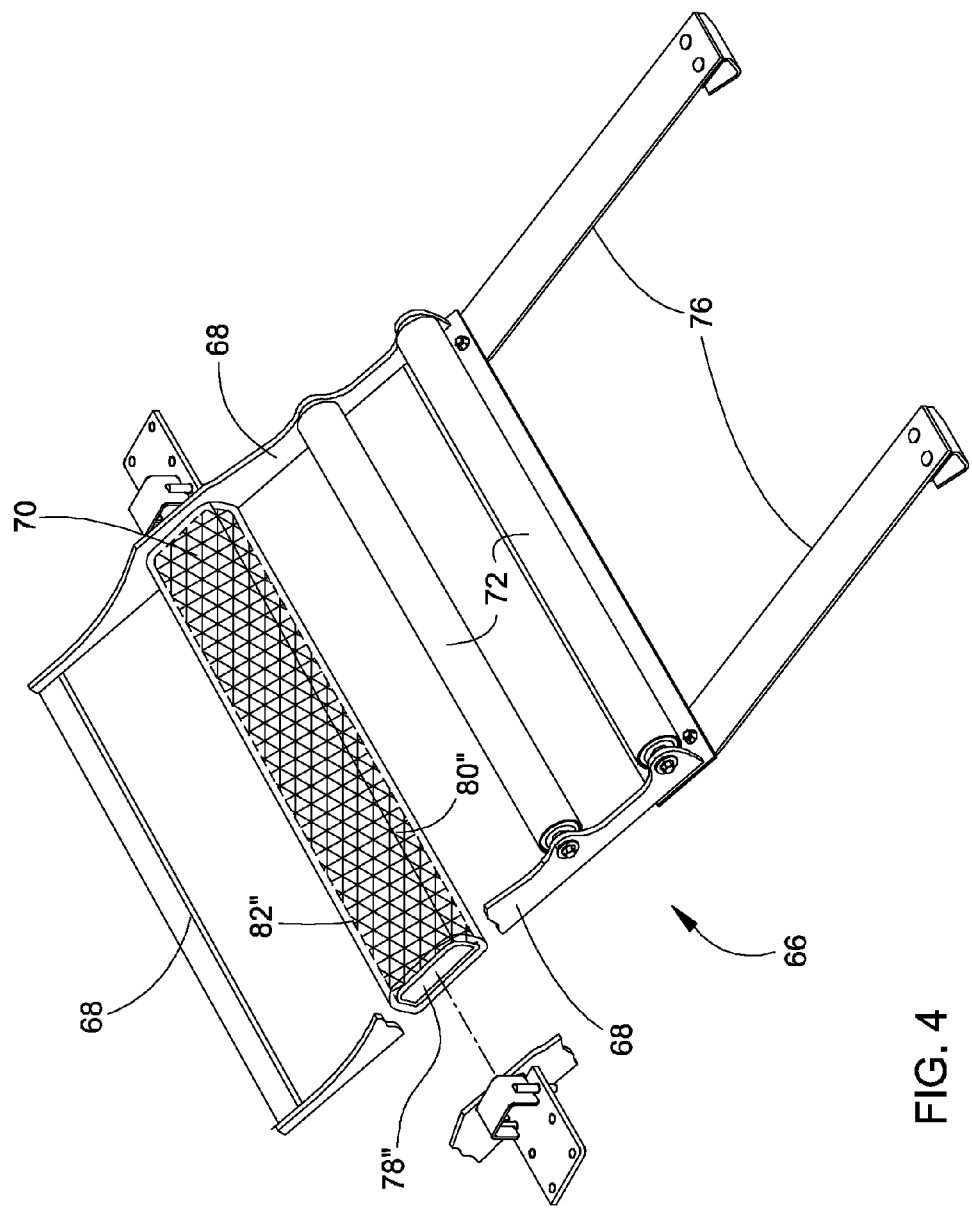
FIG. 4 is a schematic perspective side view of the discharge ramp in FIG. 1 with a portion being broken away and exploded exposing an end profile of a third embodiment of the handling element.

The discharge region 32 contains a discharge ramp 66 as shown in more detail in FIGS. 2 to 4.

The discharge ramp 66 comprises a ramp frame 68 on which are attached a handling element 70 extending transverse to the round baler 10, and further handling elements 72 extending transverse to the baler and formed as rollers. The ramp frame 68 has a downward slope extending in the longitudinal direction of the round baler 10 and serves for guiding an ejected bale under control onto the ground surface 74, wherein the downward slope angle diminishes towards the rear region (opposite the direction of travel) of the round baler 10. At the lower region of the discharge ramp 66 are fitted spring webs 76 which, after the round bale has been guided over the handling elements 70, 72, deform elastically under the weight of the round bale and deposit the round bale in a cushioned manner on the ground surface 74.

FIG. 2 shows a first embodiment of the handling element 70. The handling element 70 is formed as a roller 78, preferably as a steel roller. The roller 78 is mounted such that it can rotate or is fixed at both ends on the ramp frame 68. The handling element 70 is arranged such that the round bale falls onto the roller 78 during the discharge process. To move a falling round bale in the direction of the downward sloping discharge ramp 66, the handling element 70 is arranged preferably in front of the rotation axis of the round bale in the direction of travel. The roller 78 is surrounded by an elastic layer 80 (shown hatched in the figures) which preferably consists of a foam material but can comprise any other elastic material, such as for example rubber or another elastomer. Furthermore, to protect the elastic layer 80, a cover 82 is provided which in the embodiment example shown in FIG. 2 is formed as a tube, preferably of plastic, and is guided floating over the elastic layer 80 and surrounds this completely. Alternatively, as a cover 82, a correspondingly resistant film can be used which is wrapped about the elastic layer 80. The cover 82 is formed such that it resists the mechanical loads from the round bale and protects the elastic layer 80 from damage. The cover 82 is mounted floating as a relatively stable tube on the elastic layer 80 or on the roller 78. Under the effect of the weight of the round bale, the cover 82 or the tube is pushed downwards out of a central position in relation to the roller 78 so that the elastic layer 80 is deformed or compressed accordingly on the top by the upper inside of the tube. Thus part of the energy introduced by the round bale is dampened. As soon as the round bale has left the handling element 70, the plastic tube is moved back to the central position by the release of tension on the elastic layer 80. If a film is used as a cover 82, this must be made correspondingly deformable so that the movements executed by the elastic layer 80 are not obstructed.

FIG. 3 shows a second embodiment of the handling element 70 which substantially corresponds to the embodiment in FIG. 2 and differs only in the form of the handling element 70. The handling element 70 is here formed as a rectangular profile 78', preferably a steel profile. An elastic layer 80' is also provided and is protected in the same way as described above by a cover 82', which however is adapted according to the profile of the handling element 70.

FIG. 4 shows a third embodiment of the handling element 70 which substantially corresponds to the embodiment in FIGS. 2 and 3 and also differs only in the form of the handling element 70. The handling element 70 is here formed as a flat profile 78", preferably as a steel plate. Here again, an elastic layer 80" is provided which is protected by a cover 82", which however is adapted to the form of the handling element 70 and can also be formed plate-like, for example as a plastic plate. To support the rotary movement of the round bale in the direction of the downward sloping discharge ramp 66, the flat profile 78" has a slight downward slope.

Having described the preferred embodiment, it will become apparent that various modifications can be made without departing from the scope of the invention as defined in the accompanying claims.

The invention claimed is:

1. A round baler comprising a frame, a baling chamber adapted to form a round bale having a rotation axis extending traverse to a direction of travel of the baler, the baling chamber being formed on the frame, a discharge ramp between the baling chamber and a ground surface, first and second elongate handling elements arranged on the discharge ramp and extending parallel to the rotation axis of the round bale and being located in a path taken by a falling bale once discharged from the baling chamber so as to be engaged by the falling bale during a discharge process, the first elongate handling element including a rigid profile carrier having an exterior provided with an elastic layer of material which deforms elastically, upon being engaged by the bale, an amount for absorbing sufficient kinetic energy of the discharged bale so as to prevent damage to the bale during the discharge process, the profile carrier shaped so as to define a flat profile on which the elastic layer is formed, the elastic layer covered at least partially by a cover mounted so as to move together with the elastic layer under the influence of a discharged bale engaging the first elongate handling element, the second elongate handling element positioned between the first elongate handling element and an end of the discharge ramp, and the second elongate handling element moving independently of the first elongate handling element.

2. The round baler according to claim 1, wherein the elastic layer is substantially covered by the cover.

3. The round baler according to claim 1, wherein the elastic layer is formed from at least one of a foam, an elastomer and another elastic material.

4. The round baler according to claim 1, wherein the first handling element is positioned in front of the rotation axis of the round bale when the round bale is received.

5. A round baler comprising:
a discharge ramp sloping downward from a position near the baling chamber towards a ground surface, the discharge ramp configured to receive a round bale from the baling chamber and deposit the round bale on the ground surface;
a first handling element positioned on the discharge ramp and extending parallel to the rotation axis of the round bale, first handling element shaped so as to define a flat profile having an elastic layer on an exterior surface contacted by the round bale, the elastic layer surrounded by a protective cover; and
a second handling element positioned on the discharge ramp and extending parallel to the first handling element, the second handling element positioned nearer the ground surface than the first handling element, the second handling element positioned between the first handling element and a discharge end of the discharge ramp, and the second handling element moving independently of the first handling element.

6. The round baler of claim 5, wherein the first handling element is positioned in front of the rotation axis of the round bale when the round bale is received.

7. The round baler of claim 5, wherein the first handling element is a flat plate and the second handling element is a roller.

8. The round baler of claim 5, wherein the first handling element has a rectangular profile and the second handling element is a roller.

9. The round baler of claim 5, wherein the protective cover is plastic.

10. The round baler of claim 5, wherein the elastic layer is a foam material.

11. The round baler of claim 5, wherein the elastic layer is rubber.

12. The round baler of claim 5, wherein the elastic layer is an elastomer.

13. The round baler of claim 5, further comprising:
a third handling element positioned on the discharge ramp and extending parallel to the first handling element, the third handling element positioned closer to the ground surface than the second handling element, the third handling element moving independently of the first and second handling elements.

* * * * *